United States Patent Office 2,836,537
Patented May 27, 1958

2,836,537
METHOD OF TREATING PLANTS TO PROTECT AGAINST RUST

Joseph B. Skaptason, Wedford, Pa., assignor to Pittsburgh Coke & Chemical Company, Pittsburgh, Pa., a corporation of Pennsylvania No Drawing. Application May 4, 1955
Serial No. 506,073

20 Claims. (Cl. 167—22)

The present invention relates to the treatment of plants and, particularly, to the treatment of wheat, oats, rye, barley and other cereals and vegetables to avoid what is commonly known as "rust."

It has been found that salts of ethylene diamine tetraacetic acid applied either as a powder or as an aqueous solution or dispersion to the plants is particularly effective to preserve the plants and especially cereals such as wheat and oats from the rust. Among the EDTA salts which we have found to be effective are the ferric, ferrous, cupric, cuprous, zinc, magnesium, aluminum, sodium, potassium, manganese, nickel, lead, cobalt, barium, calcium, as well as amine salts, such as ethylene diamine, methylamine, triethylamine, ethanolamine, diethanolamine and triethanolamine. The metal salts are preferred, and especially preferred are the ferric and cupric salts, and of these the ferric have proven to be most satisfactory.

It is desirable that the salts be of the water-soluble type and, in general, it has been found that they can be employed in a dosage of 50 to 2000 parts per million in aqueous solution, although the upper limit is not critical. Of course, the EDTA salt should not be used in an amount which will be phytotoxic to the plant.

When the EDTA salt is applied as a dust, it should be used in an amount equivalent to the amount employed in the aqueous form.

Example I

Ferric EDTA was sprayed upon wheat plants that had been previously inoculated with the rust organism. The disease was in the plant but there was no visible sign of it. The ferric salt was applied as an aqueous spray containing 2000 p. p. m., and at a rate of 50 gallons per acre about four days after the inoculation. The rust organism was effectively controlled.

Example II

In this example the spraying was prior (1 day) to the inoculation and complete immunization was achieved.

Example III

In this example the spraying took place after visible presence of the disease, and further rust development was arrested. Without this treatment new growth continues to be infected.

Example IV

Examples I, II and III were repeated using oats with similar results.

Example V

Examples I to IV were repeated using the ferric salt in the form of a dry powder which was dusted on the plants at the rate of 30 pounds per acre of a 2½% mixture of the salt with 97½% of an inert carrier, e. g., talc. Dusting is best done in the evening or early morning when there is dew on the plants.

The results achieved in each example were similar.

Example VI

Examples I to V were followed using the cupric salt, and satisfactory control of rust was obtained.

In addition to the ferric and cupric salts, tests with salts of the other metals mentioned above were conducted and found to be operative, but less effective, than the cupric and ferric salts, the tests being carried out in accordance with the foregoing examples. In this connection, other valences of copper and iron, notably, cuprous and ferrous salts, were tried, as in the foregoing examples, and were found to be operative, but not quite as effective as the cupric and ferric salts.

Example VII

Example I was repeated using the triethanolamine salt of EDTA. Effective control of the rust was obtained, although there appeared to be slight injury to some of the plants.

Example VIII

Example VII was repeated on oats with substantially identical results.

The use of other of the amine salts mentioned above, as well as the ammonium salt of EDTA gave satisfactory results when tests were carried out in accordance with the foregoing examples.

Example IX

An aqueous solution of ferric EDTA was applied to the soil of pots containing wheat plants before inoculation of the plants with rust organism. .8 g. of ferric EDTA in 50 cc. of water to a 4 inch flower pot gave complete control of rust.

In the foregoing examples the salts used are those commercially obtainable from several sources. However, in the case of the amine and ammonium salts, we prefer to neutralize the EDTA with the appropriate amine in order to make the same.

Example X

Ferrous EEDTA (N(β-hydroxy ethyl) ethylene diamine triacetate), as commercially obtainable, was used as in Example I, with good results.

With EEDTA the same salts can be utilized as with EDTA, as described above, the ferrous salt being given as an illustration in Example X.

Similarly, the soil containing the plants may be treated with the various salts of EEDTA, as described above in Example IX, the tests in this connection extending to all of the compounds described herein, with successful results.

For the purpose of the foregoing tests inoculation of the plants with rust was conducted in the following manner:

Seven days after seedlings were planted in 4 inch pots, they were inoculated with rust spore diluted at a ratio of 1:50 with talc while the plants were in an incubator at 100% relative humidity at 70° to 74° F. The rust-talc mixture is uniformly dusted over the plants which were maintained in the incubator for 24 hours after inoculation. The plants were then removed from the incubator and treated with the compounds of the present invention 4 days after inoculation with the rust spore (11 days after planting). This was the procedure followed except where the plant was permitted to develop visible signs of rust, or where the treatment was prior to the inoculation.

*Example XI*

In the foregoing examples, e. g., Example I, using an aqueous solution, I included a wetting agent such as "Tween-20" (polyoxyethylene sorbitan monolaurate) with improved results. The wetting agent was included in amount of about 0.1%.

Other compounds have been found effective in controlling rust in plants, such as wheat and oats. Among such compounds there can be employed a salt of cyanomethyl ethylene diamine triacetic acid, e. g. ferric, ferrous, cupric, cuprous, zinc, magnesium, aluminum, sodium, potassium, manganese, nickel, lead, cobalt, barium, calcium, ammonium, as well as amine salts, such as ethylene diamine, methylamine, triethylamine, ethanolamine, diethanolamine and triethanolamine; the corresponding salts of nitrogen triacetic acid

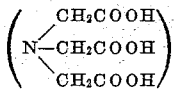

e. g., the ferric salt; the corresponding salts of 1,2 cyclohexane diamine N,N,N',N' tetra-acetic acid, e. g., the ferric salt; the corresponding salts of diethylene triamine penta-acetic acid, e. g., the ferric salt; and the corresponding salts of triethylene tetraamine hexa-acetic acid, e. g., the ferric salt.

*Example A*

Ferric cyanomethyl ethylene diamine triacetate was sprayed upon wheat plants that had been previously inoculated with the rust organism. The disease was in the plant but there was no visible sign of it. The ferric salt was applied as an aqueous spray containing 2000 p.p.m., and at a rate of 50 gallons per acre about 4 days after the inoculation. The rust organism was effectively controlled.

*Example B*

Example A was repeated replacing the ferric cyanomethyl ethylene diamine triacetate by the ferric salt of nitrogen triacetic acid. The rust organism was, likewise, effectively controlled.

*Example C*

Example A was repeated replacing the ferric cyanomethyl ethylene diamine triacetate by the ferric salt of 1,2 cyclohexane diamine N,N,N',N' tetra-acetic acid. The rust organism was, likewise effectively controlled.

*Example D*

Example A was repeated replacing the ferric cyanomethyl ethylene diamine triacetate by the ferric salt of diehtylene triamine penta-acetic acid. The rust organism was, likewise, effectively controlled.

*Example E*

Example A was repeated replacing the ferric cyanomethyl ethylene diamine triacetate by the ferric salt of triethylene tetramine hexa-acetic acid. The rust organism was also controlled effectively.

I claim:

1. A method of treating cereal grain plants to protect them against rust comprising applying to the plant a metal salt of an aminocarboxylic acid selected from the group consisting of ethylene diamine tetraacetic acid, hydroxyethyl ethylene diamine triacetic acid, cyanomethyl ethylene diamine triacetic acid

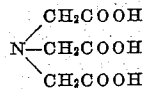

1,2-cyclohexane diamine N,N,N',N' tetra-acetic acid, diethylene triamine penta-acetic acid and triethylene tetramine hexa-acetic acid, the metal being selected from the group consisting of iron, copper, zinc, magnesium, aluminum, sodium, potassium, manganese, nickel, lead, cobalt, barium and calcium.

2. The method of claim 1 wherein the plant is wheat.
3. The method of claim 1 wherein the plant is oats.
4. The method of protecting cereal grains against rust comprising applying a metal salt of ethylene diamine tetraacetic acid to the growing plant in an amount sufficient to protect the plant against rust, the metal being selected from the group consisting of iron, copper, zinc, magnesium, aluminum, sodium, potassium, manganese, nickel, lead, cobalt, barium and calcium.
5. The method of claim 4 wherein the metal is iron.
6. The method of claim 4 in which the metal is copper.
7. The method of claim 6 in which the copper is in the cupric condition.
8. The method of claim 5 in which the iron is in the ferric condition.
9. A method of protecting cereal grains against rust comprising applying a metal salt of ethylene diamine tetraacetic acid together with a wetting agent to the growing plant in an amount sufficient to protect the plant against rust, the metal being selected from the group consisting of iron, copper, zinc, magnesium, aluminum, sodium, potassium, manganese, nickel, lead, cobalt, barium and calcium.
10. A method of protecting cereal grains against rust comprising applying a metal salt of hydroxy ethyl ethylene diamine tri-acetic acid to the growing plant in an amount sufficient to control the rust, the metal being selected from the group consisting of iron, copper, zinc, magnesium, aluminum, sodium, potassium, manganese, nickel, lead, cobalt, barium and calcium.
11. The method of claim 10 in which the salt is a copper salt.
12. The method of claim 11 in which the salt is a cupric salt.
13. A method of protecting cereal grains against rust comprising applying a metal salt of diethylene triamine penta-acetic acid to the growing plant in an amount sufficient to control the rust, the metal being selected from the group consisting of iron, copper, zinc, magnesium, aluminum, sodium, potassium, manganese, nickel, lead, cobalt, barium and calcium.
14. A method according to claim 13 wherein the salt is an iron salt.
15. A method according to claim 14 wherein the iron is in the ferric condition.
16. A method according to claim 13 wherein the salt is a copper salt.
17. A method according to claim 13 wherein the salt is a cupric salt.
18. A method according to claim 1 wherein the salt is a copper salt.
19. A method according to claim 1 wherein the salt is an iron salt.
20. A method of treating cereal grain plants to protect them against rust comprising applying to the plant a nitrogen base salt of an amino-carboxylic acid selected from the group consisting of ethylene diamine tetraacetic acid, hydroxyethyl ethylene diamine triacetic acid, cyanomethyl ethylene diamine triacetic acid

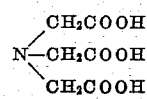

1,2-cyclohexane diamine N,N,N',N' tetraacetic acid, diethylene triamine penta-acetic acid and triethylene tetramine hexa-acetic acid, said nitrogen base being selected from the group consisting of ammonia, alkyl hydrocarbon amines, alkylene hydrocarbon amines and hydroxyalkyl hydrocarbon amines.

References Cited in the file of this patent

UNITED STATES PATENTS 2,524,219  Bersworth  Oct. 3, 1950

OTHER REFERENCES

Science, Sept. 4, 1953, p. 280.
Nature, Jan. 8, 1955, pp. 90 and 91.
Bourcart, E.: Insecticides, Fungicides and Weed Killers, 2nd ed., 1925, pp. 113, 172 and 256.
Sequestrene Bibliography, 1953–54, Geigy Ind. Chem., p. 1.
Am. J. of Pharm., Bergy, vol. 126, June 1954, pp. 198–216 (pp. 199 and 216 pert.).
Webster's New Int'l. Dictionary of the English Language, 2nd ed., 1940, p. 472.